(12) United States Patent
Lauterbach

(10) Patent No.: US 8,006,042 B2
(45) Date of Patent: Aug. 23, 2011

(54) FLOATING POINT BYPASS RETRY

(75) Inventor: Gary Lauterbach, Los Altos, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 938 days.

(21) Appl. No.: 11/944,878

(22) Filed: Nov. 26, 2007

(65) Prior Publication Data

US 2009/0138662 A1    May 28, 2009

(51) Int. Cl.
*G06F 12/00* (2006.01)
(52) U.S. Cl. ........................................ 711/150; 711/141
(58) Field of Classification Search .................. None
See application file for complete search history.

(56) References Cited

U.S. PATENT DOCUMENTS

| | | | |
|---|---|---|---|
| 5,428,807 A | 6/1995 | McKeen et al. | |
| 5,452,426 A | 9/1995 | Papworth et al. | |
| 5,561,125 A | 10/1996 | Niimura et al. | |
| 5,630,149 A | 5/1997 | Bluhm | |
| 5,632,023 A | 5/1997 | White et al. | |
| 5,784,589 A | 7/1998 | Bluhm | |
| 5,805,853 A | 9/1998 | White et al. | |
| 5,878,244 A | 3/1999 | Witt et al. | |
| 5,884,059 A | 3/1999 | Favor et al. | |
| 6,065,103 A | 5/2000 | Tran et al. | |
| 6,119,223 A | 9/2000 | Witt | |
| 6,122,656 A | 9/2000 | Witt | |
| 6,175,910 B1 | 1/2001 | Pauporte et al. | |
| 6,249,862 B1 | 6/2001 | Chinnakonda et al. | |
| 2002/0078302 A1* | 6/2002 | Favor ............................ | 711/133 |

* cited by examiner

*Primary Examiner* — Brian R Peugh
(74) *Attorney, Agent, or Firm* — Rory D. Rankin; Meyertons, Hood, Kivlin, Kowert & Goetzel, P.C.

(57) ABSTRACT

A system and method for increasing the throughput of a processor during cache misses. During the retrieval of the cache miss data, subsequent memory requests are generated and allowed to proceed to the cache. The data for the subsequent cache hits are stored in a bypass retry device. Also, the cache miss address and memory line data may be stored by the device when they are retrieved and they may be sent them to the cache for a cache line replacement. The bypass retry device determines the priority of sending data to the processor. The priority allows the data for memory requests to be provided to the processor in the same order as they were generated from the processor without delaying subsequent memory requests after a cache miss.

16 Claims, 3 Drawing Sheets

FLOATING POINT BYPASS RETRY

BACKGROUND OF THE INVENTION

1. Field of the Invention

This invention relates to computing systems, and more particularly, to increasing the throughput of a processor during cache misses.

2. Description of the Relevant Art

Pipelining is used to increase the throughput of instructions per clock cycle (IPC) of processor cores, or processors. However, the throughput may still be reduced due to certain events such as pipeline stalls. Stalls may be caused by a branch misprediction, a cache miss, data dependency, or other, wherein no useful work may be performed for a particular instruction during a clock cycle.

Different techniques are used to fill these unproductive cycles in a pipeline with useful work. Some examples include loop unrolling of instructions by a compiler, branch prediction mechanisms within a core and out-of-order execution within a core. An operating system may divide a software application into processes and further divide processes into threads. A thread, or strand, is a sequence of instructions with no control flow instructions that may share memory and other resources with other threads and may execute in parallel with other threads. A processor core may be constructed to execute more than one thread per clock cycle in order to increase efficient use of the hardware resources and reduce the effect of stalls on overall throughput. A microprocessor may include multiple processor cores to further increase parallel execution of multiple instructions per clock cycle.

The above techniques may hide some of the unproductive clock cycles due to cache misses by overlapping them with useful work of other instructions. If the latencies of L1 and L2 cache misses are great, some unproductive cycles may still occur in the pipeline and the IPC may still decrease. Some techniques to decrease the stall cycles due to cache misses include using larger sized caches, using higher associativity in the caches, speculatively prefetching instructions and data, use non-blocking caches, using early restart or critical word first, using compiler optimizations, or other.

Some scientific applications are memory intensive such as high performance computing (HPC) software applications. A few application examples include climate simulations of the world's oceans, complex fluid dynamic (CFD) problems such as a tunnel model of an aircraft wing using Navier/Stokes equations, computational chemistry, and an air quality model used by the U.S. environment protection agency (EPA). These scientific applications are memory intensive with ratios of memory instructions per single floating-point instruction as high as 400 to 1,400. Also, the codes tend to be loop-intensive and benefit from architectures that offer single-instruction-multiple-data (SIMD) operations. The loops are able to operate on multiple data elements in a data set with a single operation.

Therefore, a critical performance bottleneck for a processor executing code as described above, is a processor's forwarding-store buffer and the cache design. The stall cycles from cache misses need to be reduced in order to efficiently supply data to the operations. A non-blocking cache may be used in order to perform hits-under-misses and increase the IPC.

A problem may arise with scientific applications that do not have data locality and therefore have high data dependency such as computational chemistry. A non-blocking cache may not help, since the data from hits-under-miss may not be used until the data from the cache miss is returned. A blocking cache may ensure in-order supply of the data, but the latencies from the cache miss and subsequent cache hits accumulate and reduce the IPC.

In view of the above, efficient methods and mechanisms for increasing the throughput of processors are desired.

SUMMARY OF THE INVENTION

Systems and methods for increasing the throughput of a processor during cache misses are contemplated. In one embodiment, a computer system is provided comprising a processor, a cache subsystem, and a memory. A bypass retry device may be included in a first-level cache. In an alternative embodiment, the bypass retry device may be provided outside the other components, but coupled to the cache and processor. The processor may be executing scientific applications that are memory intensive and have data dependency between instructions. The processor may generate memory requests to the cache in order to retrieve data for a software application. The processor may not be able to execute a block of instructions out-of-order due to a data dependency. The cache may not contain the data required for a memory request. In this case, the processor needs to send the request to the next level in the cache subsystem and possibly to memory if the data is not located in the next level.

While the cache miss is being serviced, the processor may continue to generate memory requests to the cache. The memory line data from subsequent cache hits may not be returned to the processor, since the corresponding instructions may not be able to proceed until the cache miss data is retrieved. The bypass retry device may store the address and memory line data of subsequent cache hits. Also, it may store the cache miss address and memory line data when they are retrieved and send them to the cache for a cache line replacement.

Selection logic within the bypass retry device may determine the priority of sending data to the processor. For example, the selection logic may determine a first priority memory line to send to the processor is a memory line returned from a cache miss. Then the selection logic may determine a second priority memory line to send to the processor is a stored memory line after the first priority memory line has been sent. Next, it may determine a third priority memory line to send to the processor is data from a cache hit after all stored memory lines have been sent. Therefore, the data for memory requests are provided to the processor in the same order as they were generated from the processor without delaying subsequent memory requests after a cache miss.

In another aspect of the invention, a method is provided to supply a processor with requested data in the order they were generated from the processor. Subsequent memory requests after a cache miss are allowed to proceed in order to reduce the memory access latencies. Data for a software application may be stored by the method and a subset of the data may also be stored in a cache. As the application is executed, memory requests for the data may be generated and sent to the cache. If the data is not found in the cache, a miss signal is generated and the data is retrieved from memory. During the retrieval of the miss data, subsequent memory requests are generated and allowed to proceed. The data for the subsequent cache hits are stored by the method. Also, the cache miss address and memory line data may be stored when they are retrieved and they may be sent them to the cache for a cache line replacement.

The method may determine the priority of sending data to the processor. It may determine a first priority memory line to send to the processor is a memory line returned from a cache miss. Then the method may determine a second priority memory line to send to the processor is a stored memory line after the first priority memory line has been sent. Next, it may determine a third priority memory line to send to the processor is data from a cache hit after all stored memory lines have been sent.

Figure 1:
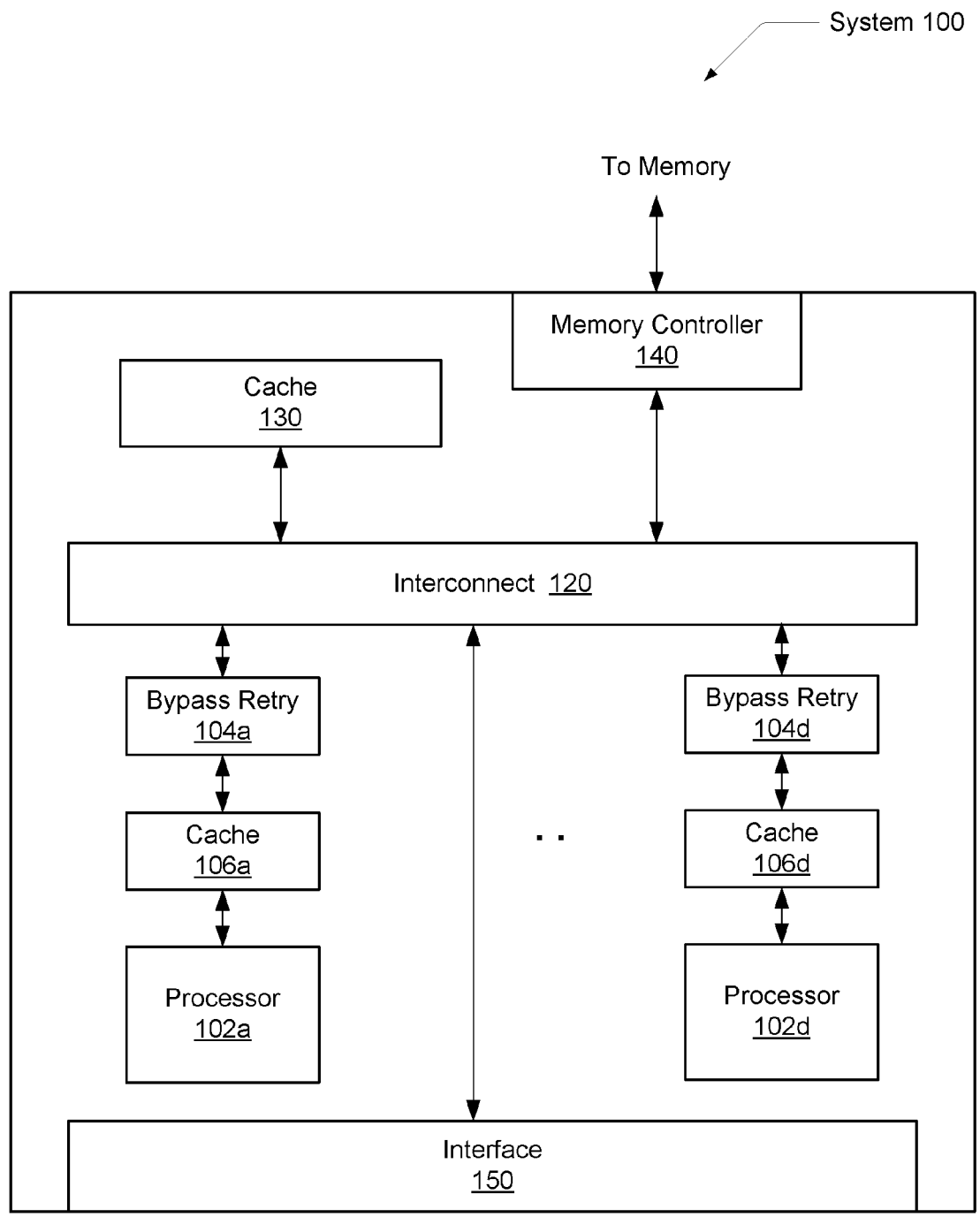
FIG. 1 is a generalized block diagram illustrating one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, one embodiment of a computing system 100 is shown. One or more processors 102a-102d may be included in system 100. As used herein, elements referred to by a reference numeral followed by a letter may be collectively referred to by the numeral alone. For example, processors 102a-102d may be collectively referred to as processors 102. Each processor 102 may include one or more processor cores. Each core within processor 102 generally includes circuitry to execute instructions of a predefined instruction set architecture (ISA). Each core may include a superscalar microarchitecture with a multi-stage pipeline. In some embodiments, a multi-stage pipeline may perform out-of-order execution of the instructions of the ISA. Also, each core may be configured to simultaneously execute instructions for one or more threads of a software application. Various embodiments may be chosen for the implementation of processor 102 and its cores.

In one embodiment, a memory subsystem accompanying processors 102 may include several levels. The highest level may include the registers within processors 102. The next level may include a cache 106. Cache 106 may be on the same semiconductor die as processor 102 or it may be located off-die, but near to processor 102. Each processor 102 may have its own cache 106. A translation lookaside buffer (TLB) may be included for each cache 106 and subsequent levels of caches for address matching of the requested memory line. Processors 102 may perform speculative prefetching of both instructions from an i-cache and data from a d-cache.

A lower level of the memory subsystem may include cache 130, which may be shared by processors 102 and caches 106. Below the cache hierarchy may be a memory controller 140 to interface with lower-level memory that may comprise other levels of cache on the die outside the microprocessor, dynamic random access memory (DRAM), dual in-line memory modules (dimms) in order to bank the DRAM, a hard disk, or a combination of these alternatives.

Interconnect 120 may be configured to convey memory requests from processors 102 to cache 130 or to memory controller 140 and the lower levels of the memory subsystem. Also, interconnect 120 may convey received memory lines and control signals from lower-level memory via memory controller 140 to processors 102 and caches 106 and 130. Interconnect bus implementations between interconnect 120, memory controller 140, interface 150, processors 102, and caches 106 and 130 may comprise any suitable technology. Interface 150 generally provides an interface for I/O devices off the microprocessor to the memory subsystem and processors 102. I/O devices may include peripheral network devices such as printers, keyboards, monitors, cameras, card readers, hard disk drives or other.

In one embodiment, as will be discussed in further detail below, bypass retry 104 is configured to maintain in-order memory requests to processor 102 without blocking subsequent memory requests after a cache miss. When a cache miss occurs with cache 106, a non-blocking version of cache 106 allows subsequent memory requests from processor 102 to proceed. However, without bypass retry 104, the memory lines returned to processor 102 are out-of-order. A blocking version of cache 106 does not allow subsequent memory requests to proceed after a cache miss. Memory lines are returned to processor 102 in-order. However, the latency is greater than the latency of a non-blocking version. This greater latency may reduce system performance.

After a cache miss, bypass retry 104 allows subsequent memory requests from processor 102 to cache 106 to proceed. However, memory lines are returned to processor 102 in-order. Therefore, cache 106 may be non-blocking, and processor 102 receives the memory lines in-order. Processor 102 may be executing code for scientific applications that have a high data dependency between instructions of a loop. Table 1 shows the differences between the different implementations of handling a cache miss. For illustrative purposes, this example assumes a one clock cycle latency for a cache hit and a four clock cycle latency for a cache miss.

TABLE 1

Timing Flow of Different Cache Implementations.

| Clock Cycle | Blocking First-Level Cache | Non-blocking First-Level Cache | Bypass Retry |
|---|---|---|---|
| 1 | $1^{st}$ level cache miss - Load A. | $1^{st}$ level cache miss - Load A. | $1^{st}$ level cache miss - Load A. |
| 2 | Processor waits for data - Load A. | $1^{st}$ level cache hit - Load B. | $1^{st}$ level cache hit - Load B. |
| 3 | Processor waits for data - Load A. | $1^{st}$ level cache hit - Load C. Processor receives data - Load B. | $1^{st}$ level cache hit - Load C. |
| 4 | Processor receives data - Load A. | Cache miss data returns and is buffered- Load A. Processor receives data - Load C. | Fill Buffer filled - Load A. Processor receives data - Load A. |
| 5 | $1^{st}$ level cache hit - Load B. | $1^{st}$ level cache hit - Load D. Processor receives data - Load A. | $1^{st}$ level cache hit - Load D. Processor receives data - Load B. |
| 6 | $1^{st}$ level cache hit - Load C. Processor receives data - Load B. | Processor receives data - Load D. | Processor receives data - Load C. |
| 7 | $1^{st}$ level cache hit - Load D. Processor receives data - Load C. | | Processor receives data - Load D. |
| 8 | Processor receives data - Load D. | | |

Figure 2:
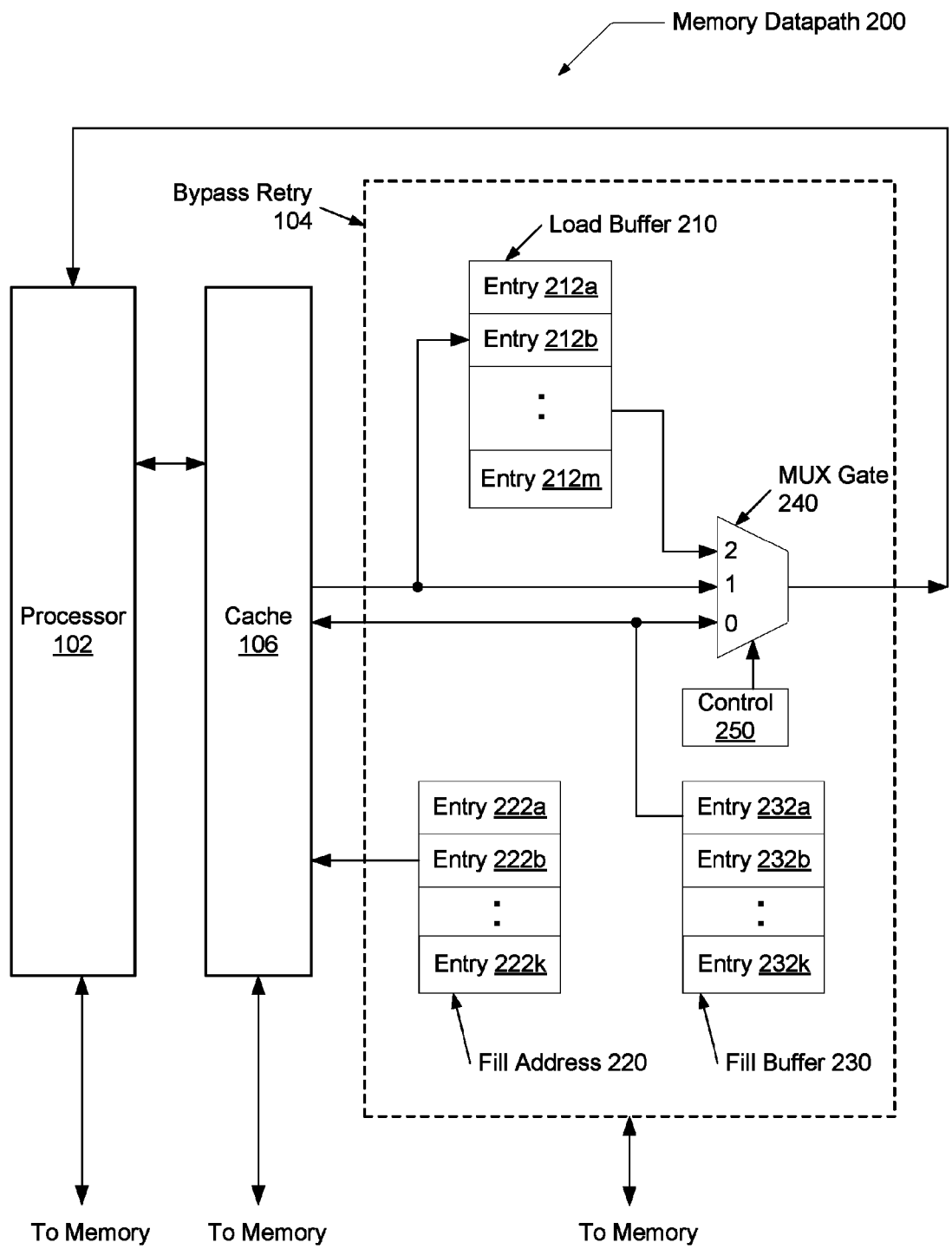
FIG. 2 is a generalized block diagram illustrating one embodiment of a load operation bypass retry circuit.

FIG. 2 illustrates one embodiment of a memory datapath 200 within computing system 100. Processor 102 is coupled to cache 106 in order to send memory requests. Whether there is a hit or a miss in cache 106, control signals are sent to control 250 within bypass retry 104. Also control 250 receives input from load buffer 210 and fill buffer 230. Circuitry in control 250 determines during each clock cycle the source of data to send to processor 102. In one embodiment, there may be three choices for the source of data. These three choices may be sent to inputs 0-2 of a selection device such as mux gate 240.

One choice for the source of data, which may be sent to input 0 of mux gate 240, may be the data from a lower-level memory such as a level-2 (L2) cache or DRAM. This memory line data may be servicing a prior miss in cache 106. Fill address 220 and fill buffer 230 may store the address and data of this memory line respectively. Also, status bits may be stored in each entry of these buffers to denote the information is available. If only one outstanding cache miss may be serviced, there may be only one entry 222 in fill address 220 and one entry 232 in fill buffer 230. In alternative embodiments, multiple outstanding cache misses may be serviced. Fill address 220 and fill buffer 230 need as many entries as the number of possible outstanding cache misses. Also fill address 220 and fill buffer 230 may be implemented as first-in-first-out (FIFO) buffers. The control logic and queues within processor 102 becomes more complex with each outstanding cache miss and this complexity may set the limit on the number of outstanding cache misses.

A second choice for the source of data, which may be sent to input 2 of mux gate 240, may be queued cache hit data stored in load buffer 210. This data may be queued as hit-under-miss data. A prior miss in cache 106 may still be in the process of being serviced, but subsequent memory requests are allowed to proceed. However, the data of the subsequent cache hits may not be allowed to be sent to processor 102 ahead of the prior cache miss data. Therefore, the subsequent cache hit data may be queued in a FIFO buffer, such as load buffer 210, until the prior cache miss data arrives from a lower-level memory. After the prior cache miss data is sent to processor 102, then the queued data in load buffer 210 may be sent to processor 102. The queued data is stored in an entry 212, which may hold the memory line address, data, and status bits, such as a valid bit to denote the data is ready. The number of entries in load buffer 210 may be determined by the difference between the latency of a cache hit and a cache miss. This number is used for hit-under-miss cache accesses. If miss-under-miss cache accesses are permitted, the number of entries will increase.

A third choice for the source of data, which may be sent to input 1 of mux gate 240, may be cache hit data. If no cache miss is being serviced and the load buffer is empty, then the cache hit data may be forwarded to processor 102.

Figure 3:
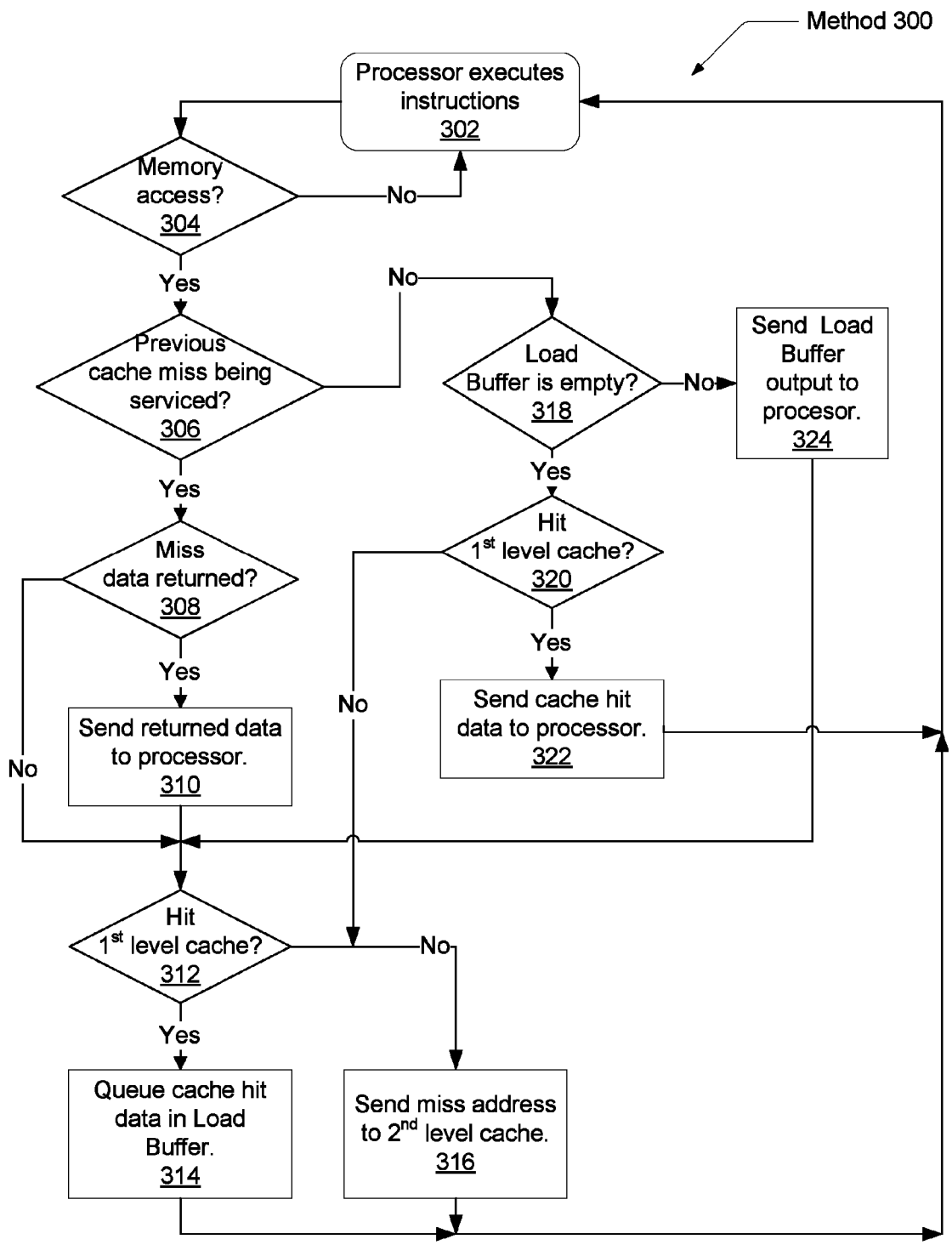
FIG. 3 is a flow diagram of one embodiment of a method for increasing the throughput of a processor during a load operation cache miss.

Referring to FIG. 3, a method 300 of one embodiment for increasing the throughput of a processor during a load operation cache miss is shown. In block 302, a processor is executing instructions of a software application, such as a scientific application having a high data dependency between instructions within a loop. The processor may need to make a memory request during execution (decision block 304). If a previous cache miss is being serviced (decision block 306) and the data has been returned from lower-level memory such as a L2 cache or DRAM (decision block 308), then this returned data is sent to the processor in block 310. Whether or not the prior cache miss data returned, if the current first-level (L1) cache memory access is a hit (decision block 312), then the L1 cache hit data is placed in the load buffer, a FIFO queue, in block 314. If the current L1 cache memory access is a miss (decision block 312), then the address of the current memory request is sent to the L2 cache in block 316.

If a previous cache miss is not being serviced (decision block 306) and the load buffer is not empty (decision block 318), then the memory line data at the head of the load buffer, a FIFO queue, is sent to the processor in block 324. Flow then continues to decision block 312 as described above. If the load buffer is empty (decision block 318) and the current first-level (L1) cache memory access is a hit (decision block 320), then the L1 cache hit data is sent to the processor in block 322. If the L1 cache memory access is a miss (decision block 320), then the address of the current memory request is sent to the L2 cache in block 316.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a cache;
   a processor, wherein the processor is configured to generate memory requests to the cache; and
   a bypass retry device configured to select data to send to the processor in an order of corresponding memory requests from the processor to the cache;
   wherein the cache is configured to:
      determine a first memory request of the memory requests is a miss; and
      process a second memory request of the memory requests prior to retrieving data for the miss from memory;
   wherein the bypass retry device is configured to:
      store a memory line from a cache hit while a cache miss is being serviced; and
      store an address and a memory line for a cache miss from lower-level memory.

2. The system as recited in claim 1, wherein the bypass retry device is further configured to determine a first priority memory line to send to the processor is a memory line returned from a cache miss.

3. The system as recited in claim 1, wherein the bypass retry device is further configured to determine a second priority memory line to send to the processor is a stored memory line after the first priority memory line has been sent.

4. The system as recited in claim 3, wherein the bypass retry device is further configured to determine a third priority memory line to send to the processor is data from a cache hit after all stored memory lines have been sent.

5. The system as recited in claim 4, wherein the bypass retry device is further configured to receive a cache hit/miss signal, a cache hit address, and a cache hit memory line.

6. The system as recited in claim 1, wherein the bypass retry device is further configured to send the address and the memory line for a cache miss from lower-level memory to the cache.

7. A method comprising:
   storing application data;
   storing a subset of said application data;
   determining a first memory request generated by a processor is a miss when data for the first memory request is not found in a cache;
   processing a second memory request prior to data for the miss is retrieved from a memory;
   selecting data to send to the processor in the order of the memory requests;

storing a memory line from a cache hit while a cache miss is being serviced; and storing an address and a memory line for a cache miss from lower-level memory.

8. The method as recited in claim 7 further comprising determining determine a first priority memory line to send to the processor is a memory line returned from a cache miss.

9. The method as recited in claim 7, further comprising determining a second priority memory line to send to the processor is a stored memory line after the first priority memory line has been sent.

10. The method as recited in claim 9 further comprising determining a third priority memory line to send to the processor is data from a cache hit after all stored memory lines have been sent.

11. The method as recited in claim 10 further comprising receiving a cache hit/miss signal, a cache hit address, and a cache hit memory line.

12. The method as recited in claim 7 further comprising sending the address and the memory line for a cache miss from lower-level memory to the cache.

13. A bypass retry device comprising:
an interface configured to communicate with a cache, a processor, and lower-level memory;
combinatorial logic;
storage elements; and
wherein the combinatorial logic is configured to select data to send to the processor in the order of memory requests from the processor to the cache; and
wherein the storage elements are configured to:
store a memory line from a cache hit while a cache miss is being serviced; and
store an address and a memory line for a cache miss from lower-level memory.

14. The bypass retry device as recited in claim 13, wherein the combinatorial logic is further configured to determine a first priority memory line to send to the processor is a memory line returned from a cache miss.

15. The bypass retry device as recited in claim 14, wherein the combinatorial logic is further configured to determine a second priority memory line to send to the processor is a stored memory line after the first priority memory line has been sent.

16. The bypass retry device as recited in claim 15, wherein the combinatorial logic is further configured to determine a third priority memory line to send to the processor is data from a cache hit after all stored memory lines have been sent.

* * * * *